United States Patent
Inoue et al.

(10) Patent No.: US 9,951,684 B2
(45) Date of Patent: Apr. 24, 2018

(54) SPARK-IGNITION ENGINE

(71) Applicants: KUBOTA Corporation, Osaka-shi, Osaka (JP); IMPCO Technologies B.V., Delfgauw (NL)

(72) Inventors: Hiroshi Inoue, Sakai (JP); Rudolf Van Dodewaard, Delfgauw (NL); Maarten G. W. Witmaar, Delfgauw (NL)

(73) Assignees: KUBOTA Corporation, Osaka-shi, Osaka (JP); IMPCO Technologies B.V., Delfgauw (NL)

( * ) Notice: Subject to any disclaimer, the term of this patent is extended or adjusted under 35 U.S.C. 154(b) by 107 days.

(21) Appl. No.: 14/842,092

(22) Filed: Sep. 1, 2015

(65) Prior Publication Data

US 2016/0115860 A1    Apr. 28, 2016

(30) Foreign Application Priority Data

Sep. 29, 2014  (JP) .................................. 2014-197949

(51) Int. Cl.
  *F02M 21/02*  (2006.01)
  *F02D 19/06*  (2006.01)
  (Continued)

(52) U.S. Cl.
  CPC ......... *F02B 43/10* (2013.01); *F02M 21/0212* (2013.01); *F02M 21/0287* (2013.01);
  (Continued)

(58) Field of Classification Search
  CPC ....... F01L 1/46; F02M 21/02; F02M 21/0239; F02M 25/089; F02M 35/10144;
  (Continued)

(56) References Cited

U.S. PATENT DOCUMENTS

| | | | |
|---|---|---|---|
| 6,227,172 B1 * | 5/2001 | Katayama | F02D 9/1095 |
| | | | 123/456 |
| 9,328,673 B2 * | 5/2016 | Inoue | F02M 21/047 |
| 2010/0199954 A1 * | 8/2010 | Inoue | F02M 25/089 |
| | | | 123/521 |

FOREIGN PATENT DOCUMENTS

| | | |
|---|---|---|
| JP | H03 156159 A | 7/1991 |
| JP | 2009127492 A | 6/2009 |
| JP | 2010-255621 A | 11/2010 |

OTHER PUBLICATIONS

Office Action dated Sep. 19, 2017 in JP Application No. 2014-197949.

* cited by examiner

*Primary Examiner* — Mark Laurenzi
*Assistant Examiner* — Anthony Ayala Delgado
(74) *Attorney, Agent, or Firm* — Panitch Schwarze Belisario & Nadel LLP

(57) ABSTRACT

There is provided a spark-ignition engine with which a gas supply device and an intake system can be integrated with the engine. In the spark-ignition engine including: a throttle body; a gas mixer; a gas regulator; and a gas relay pipe, a collector portion of an intake manifold is supported to extend in a front-back direction on one side of a cylinder head cover, the throttle body is mounted to a back portion of the collector portion of the intake manifold, the gas mixer is mounted to a back portion of the throttle body above a flywheel, the gas regulator is disposed on a side of an exhaust manifold above the flywheel and mounted to a cylinder head, and the gas relay pipe is supported to extend sideways between the gas regulator and the gas mixer behind the cylinder head cover.

7 Claims, 6 Drawing Sheets

(51) Int. Cl.
 *F02M 21/04* (2006.01)
 *F02M 35/10* (2006.01)
 *F02B 43/10* (2006.01)

(52) U.S. Cl.
 CPC ....... *F02M 21/04* (2013.01); *F02B 2043/103* (2013.01); *Y02T 10/32* (2013.01)

(58) Field of Classification Search
 CPC ........... F02M 21/0212; F02M 21/0287; F02M 21/04; F02B 2043/103; F02B 43/10; Y02T 10/32
 See application file for complete search history.

SPARK-IGNITION ENGINE

NAMES OF THE PARTIES TO A JOINT RESEARCH AGREEMENT

Kubota Corporation and IMPCO Technologies, B.V. are the joint assignees of this application and are parties to a joint research agreement that was in effect on or before the effective filing date of this application.

BACKGROUND OF THE INVENTION (1) Field of the Invention

The present invention relates to a spark-ignition engine.

(2) Description of Related Art

Conventionally, as an engine, there is an engine in which a throttle body is mounted to a front portion of a collector portion of an intake manifold and a gas mixer is mounted to the front portion of the collector portion, though a gas regulator is not mounted to the engine.

In the conventional engine, the gas regulator is not always mounted to the engine and it is impossible to integrate the gas supply device with the engine.

SUMMARY OF THE INVENTION

An object of the present invention is to provide a spark-ignition engine with which an intake system and a gas supply device can be integrated with the engine.

Matters specifying the present invention are as follows.

A spark-ignition engine comprising: an engine cooling fan disposed in front of the engine; a flywheel disposed behind the engine; a cylinder head cover mounted to an upper side of a cylinder head; an intake manifold mounted to one side wall of the cylinder head; an exhaust manifold mounted to the other side wall of the cylinder head; a throttle body; a gas mixer; a gas regulator; and a gas relay pipe, wherein a collector portion of the intake manifold is supported to extend in a front-back direction on one side of the cylinder head cover, the throttle body is mounted to a back portion of the collector portion of the intake manifold, the gas mixer is mounted to a back portion of the throttle body above the flywheel, the gas regulator is disposed on a side of the exhaust manifold above the flywheel and mounted to the cylinder head, and the gas relay pipe is supported to extend sideways between the gas regulator and the gas mixer behind the cylinder head cover.

The invention exerts the following effect.

It is possible to integrate the intake system and the gas supply device with the engine.

DETAILED DESCRIPTION OF PREFERRED EMBODIMENT

FIGS. 1 to 6 are diagrams for explaining a spark-ignition engine according to an embodiment of the present invention. In the embodiment, a water-cooled vertical inline three-cylinder dual fuel engine will be described.

Figure 5:
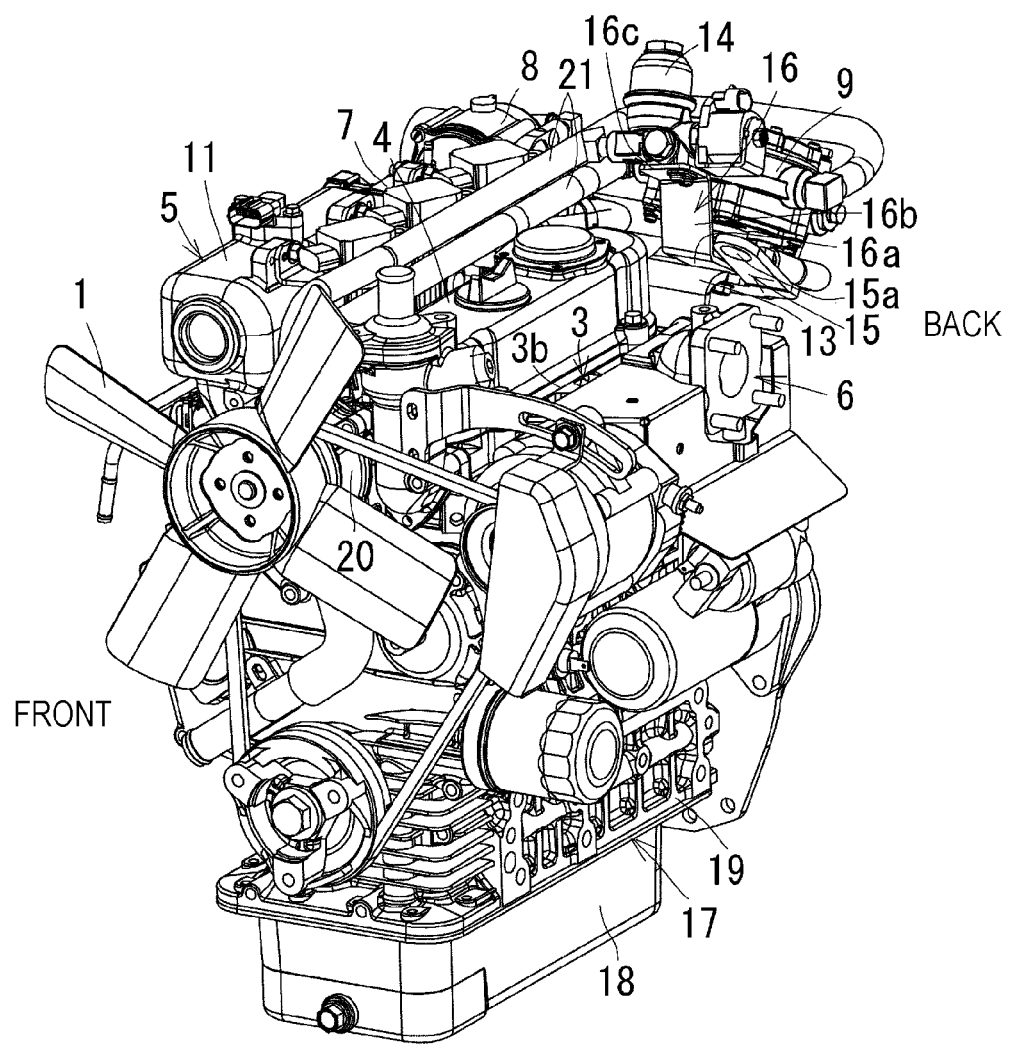
FIG. 5 is a perspective view of the engine in FIG. 1 and seen diagonally from a left side above the engine.
Figure 6:
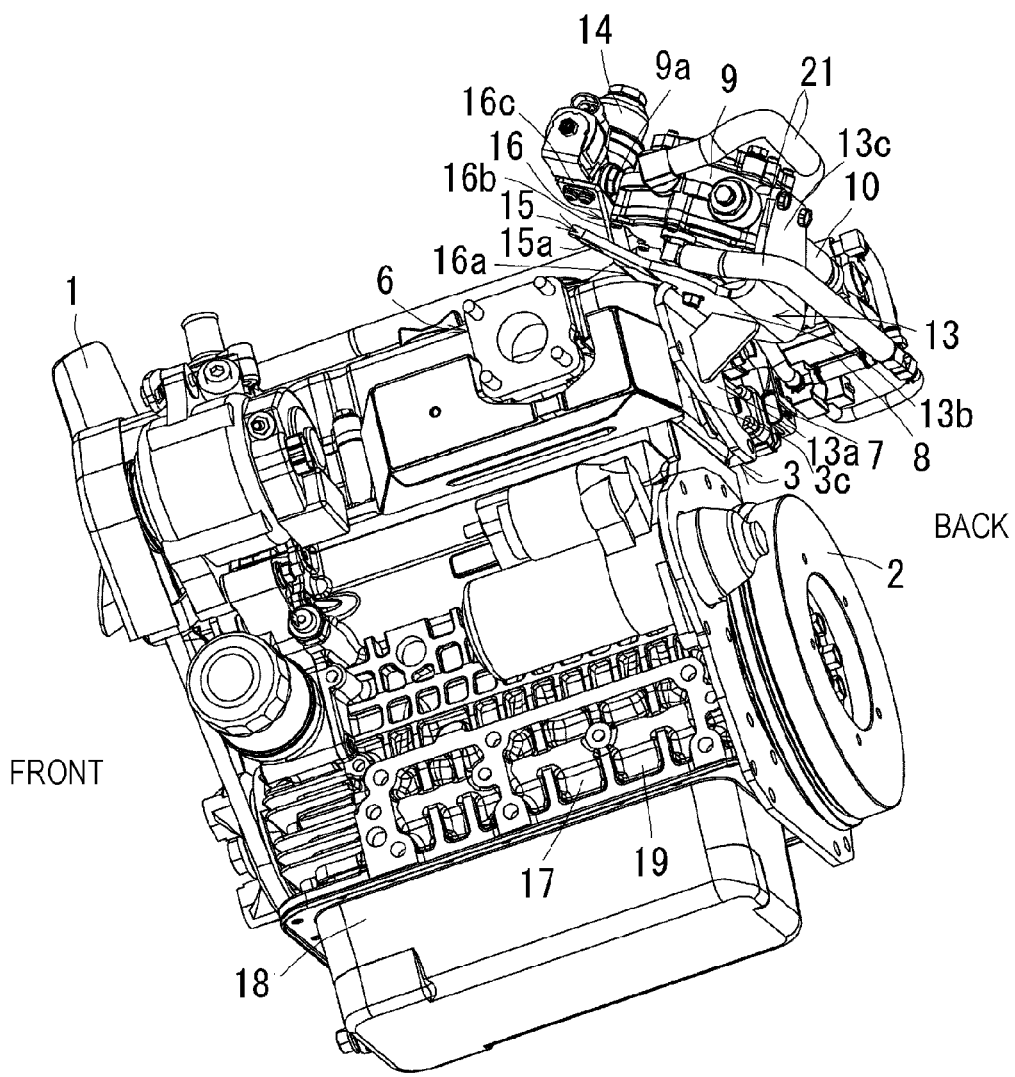
FIG. 6 is a perspective view of the engine in FIG. 1 and seen diagonally from a left side below the engine.

As shown in FIGS. 5 and 6, a cylinder head (3) is mounted to an upper portion of a cylinder block (17) and an oil pan (18) is mounted to a lower portion of the cylinder block (17). A crankcase (19) is formed at the lower portion of the cylinder block (17), cylinders (not shown) and a cylinder jacket (not shown) surrounding the cylinders are formed at the upper portion of the cylinder block (17), and a water pump (20) is mounted to a front portion of the cylinder block (17).

As shown in FIGS. 1 to 4, the engine comprises an engine cooling fan disposed in front of the engine, a flywheel disposed behind the engine, a cylinder head cover mounted to an upper side of a cylinder head, an intake manifold mounted to one side wall of the cylinder head, and an exhaust manifold mounted to the other side wall of the cylinder head.

Figure 1:
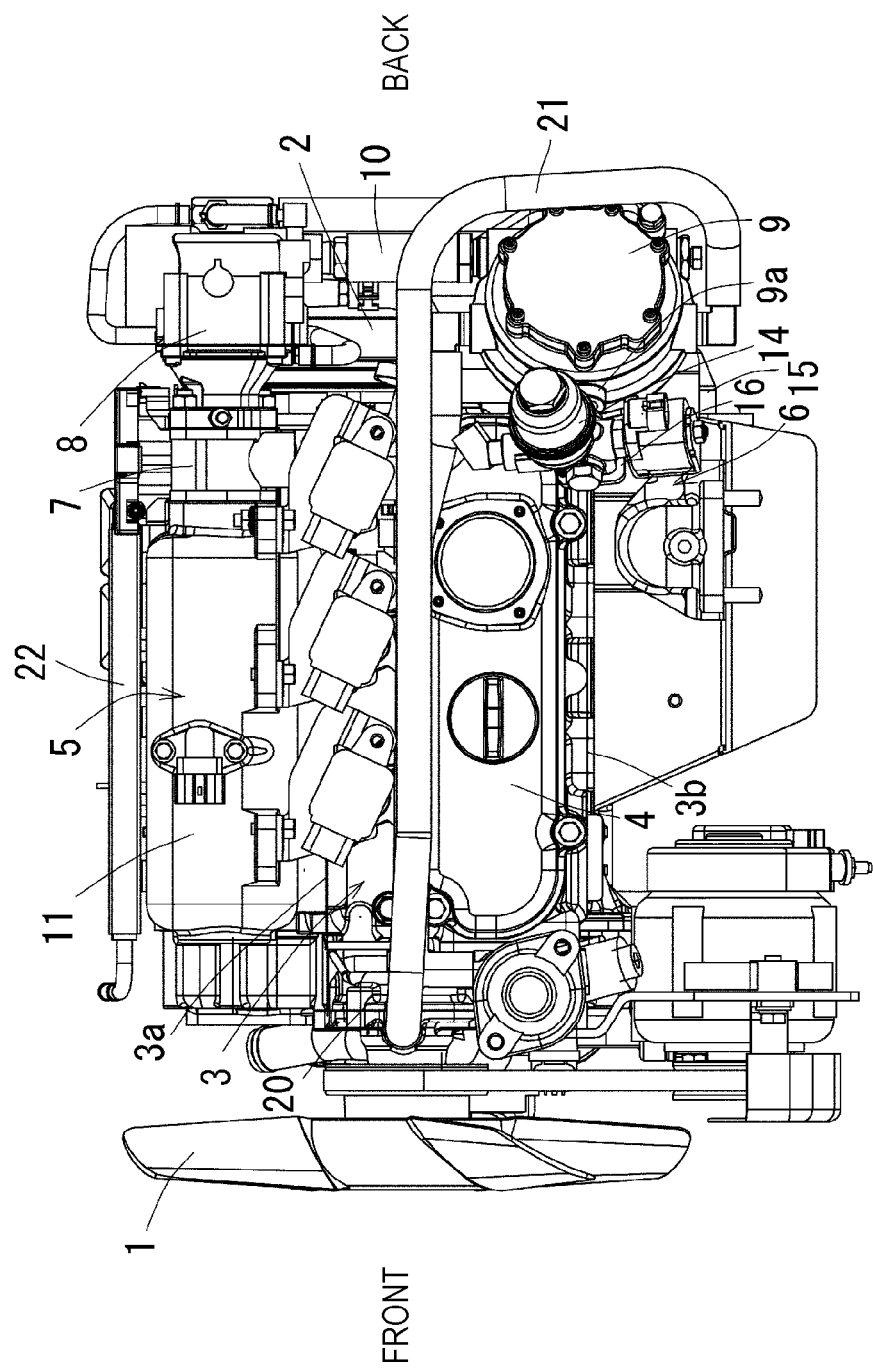
FIG. 1 is a plan view of a spark-ignition engine according to an embodiment of the present invention.
Figure 2:
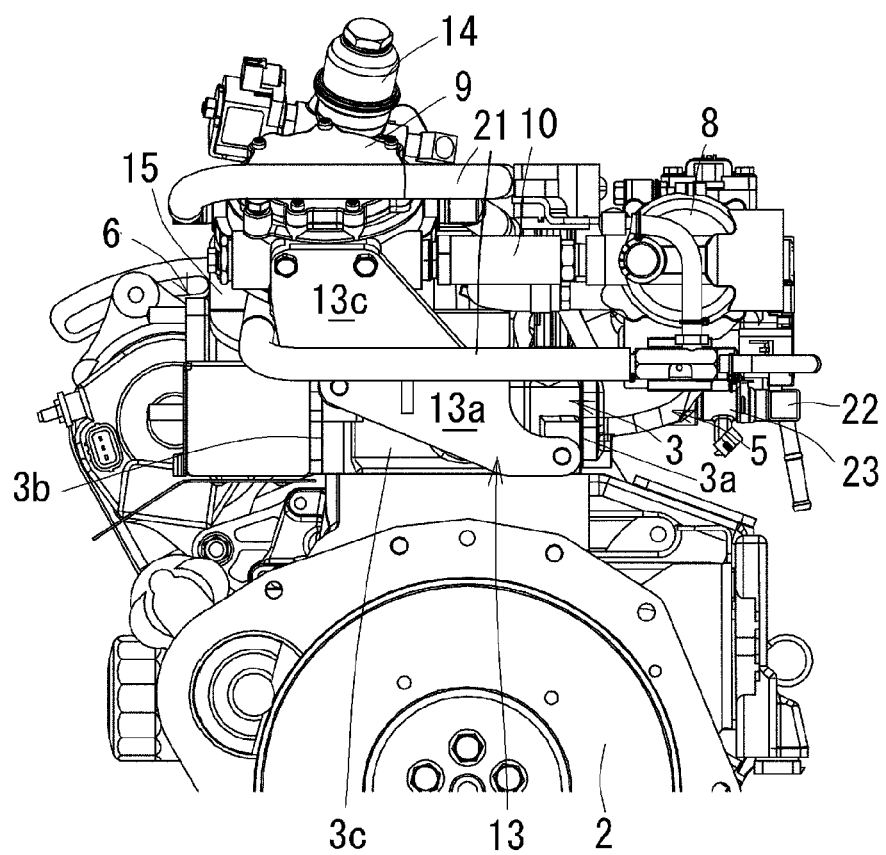
FIG. 2 is a back view of an upper portion of the engine in FIG. 1.
Figure 3:
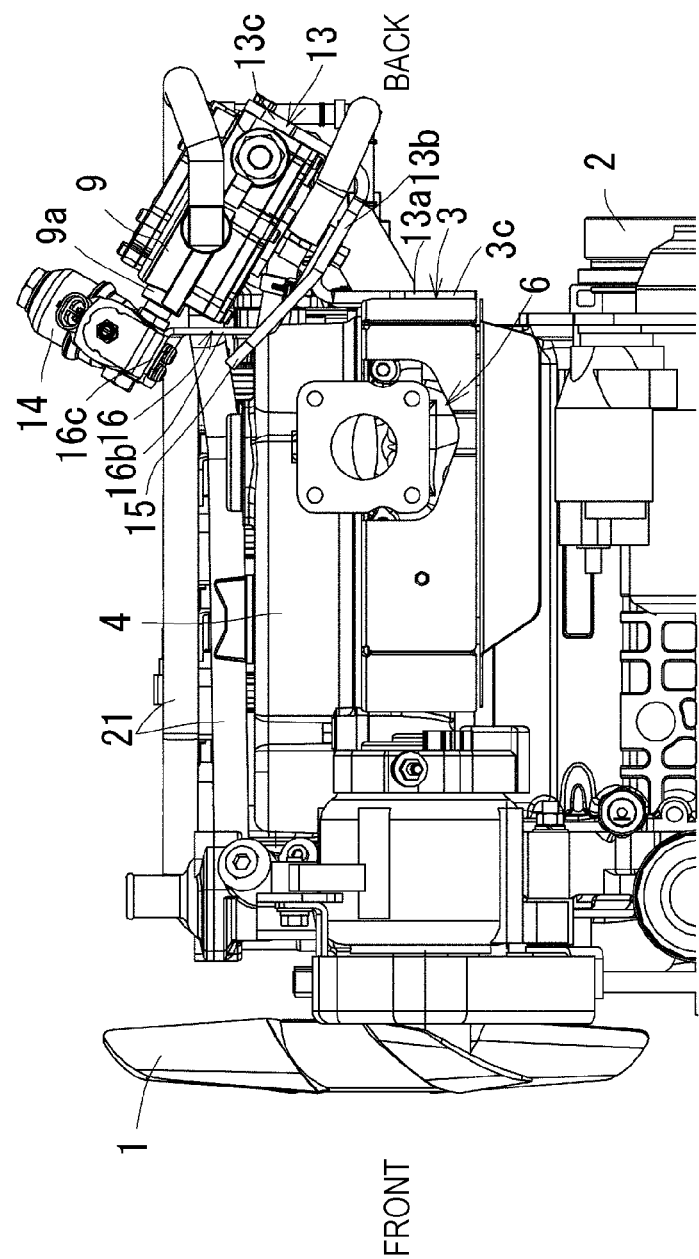
FIG. 3 is a side view of the upper portion of the engine in FIG. 1 and seen from a left side.

As shown in FIGS. 1 to 3, the engine includes a throttle body (7), a gas mixer (8), a gas regulator (9), and a gas relay pipe (10).

Figure 4:
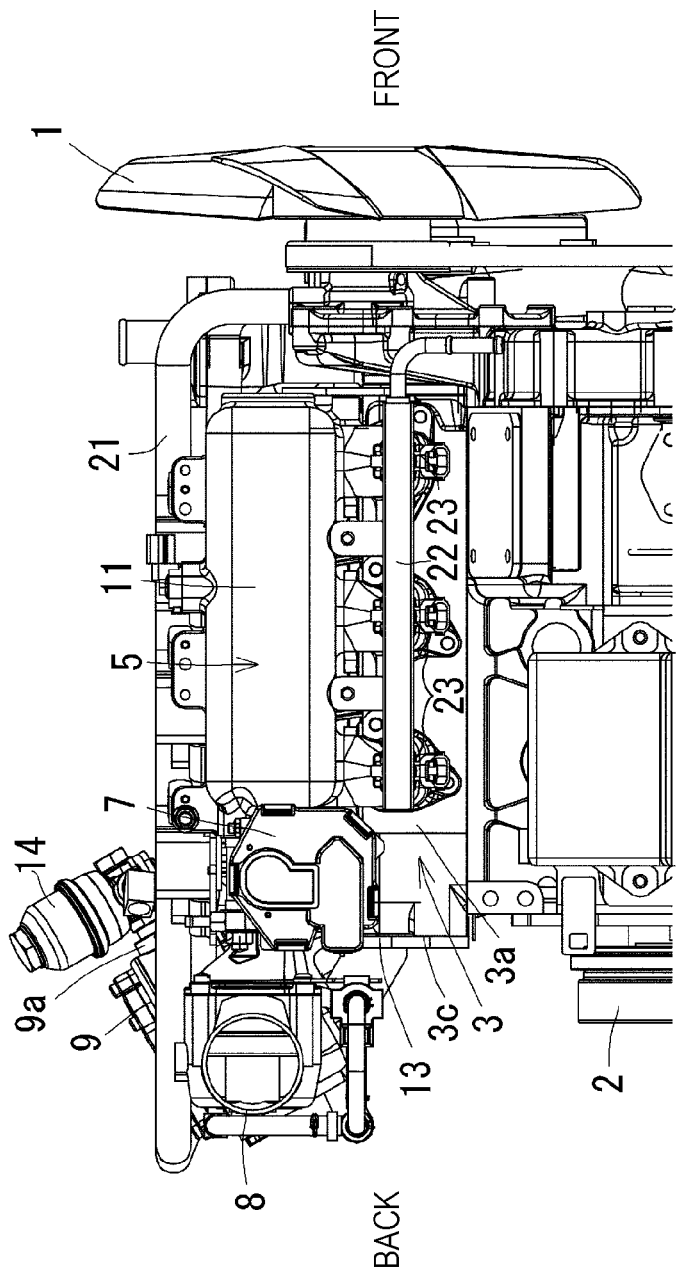
FIG. 4 is a side view of the upper portion of the engine in FIG. 1 and seen from a right side.

As shown in FIGS. 1 and 4, a collector portion (11) of the intake manifold (5) is supported to extend in a front-back direction on one side of the cylinder head cover (4), the throttle body (7) is mounted to a back portion of the collector portion (11) of the intake manifold (5), and the gas mixer (8) is mounted to a back portion of the throttle body (7) above the flywheel (2).

As shown in FIGS. 1 and 3, in the engine, the gas regulator (9) is disposed on a side of the exhaust manifold (6) above the flywheel (2) and mounted to the cylinder head (3). As shown in FIGS. 1 and 2, the gas relay pipe (10) is supported to extend sideways between the gas regulator (9) and the gas mixer (8) behind the cylinder head cover (4). Therefore, it is possible to integrate the intake system and the gas supply device with the engine.

The throttle body (7) includes an electronically-controlled throttle. The gas regulator (9) carries out vaporization and regulation of pressure of gaseous fuel. As the gaseous fuel, LPG (liquefied petroleum gas) is used. As shown in FIGS. 1 to 6, engine cooling water circulates through the gas mixer (8) and the gas regulator (9) via an engine cooling water circulating pipe (21) so as to facilitate vaporization of the gaseous fuel with heat of the engine cooling water. As the gaseous fuel, CNG (compressed natural gas) and other gaseous fuels may be used. The gas mixer (8) mixes the gaseous fuel and air.

As shown in FIGS. 1, 2 and 4, a delivery pipe (22) is supported to extend along the intake manifold (5) so that liquid fuel is supplied from the delivery pipe (22) into the respective cylinders via liquid fuel injectors (23). As the liquid fuel, gasoline is used. Fuel supply is switched between the gaseous fuel and the liquid fuel by a switch operation unit (not shown). As the switch operation unit, a switch operation button or a switch operation lever provided to a dashboard of a machine mounted with the engine is used. As the machine mounted with the engine, an industrial machine such as a forklift, a riding lawn mower, a rice planter, and a backhoe is used.

As shown in FIGS. 1 to 3 and 6, the gas regulator (9) is disposed diagonally behind and above the exhaust manifold (6) and mounted by a metal stay (13) to a back wall (3c) of the cylinder head (3). Therefore, heat of the exhaust manifold (6) is radiated to the gas regulator (9) and heat of the cylinder head (3) is transferred to the gas regulator (9) via the metal stay (13) to warm the gas regulator (9) to a proper degree to thereby facilitate the vaporization of the liquid components in the fuel and suppress the freezing of the components in the gas regulator (9).

As shown in FIGS. 3, 5, and 6, an engine hanging locking plate (15) is lead out from the metal stay (13) and the engine hanging locking plate (15) is disposed above the exhaust manifold (6). Therefore, heat released from the exhaust manifold (6) is transferred to the gas regulator (9) via the engine hanging locking plate (15) to warm the gas regulator (9) to a proper degree to thereby facilitate the vaporization of the liquid components in the fuel and suppress the freezing of the components in the gas regulator (9).

The gas regulator (9) includes a gas shutoff valve (14) as shown in FIGS. 1 to 6, the gas shutoff valve (14) is mounted to a fuel inlet (9a) on a front side of the gas regulator (9) above the exhaust manifold (6) as shown in FIGS. 1, 3, and 6, and the gas regulator (9) is sloped forward and upward as shown in FIG. 3. Therefore, it is possible to dispose the gas shutoff valve (14) positioned above the exhaust manifold (6) in a high position to thereby prevent the heat damage to the gas shutoff valve (14) due to the radiation of the heat from the exhaust manifold (6).

As shown in FIGS. 3, 5, and 6, a reinforcing stay (16) is attached to the metal stay (13), the gas shutoff valve (14) is connected to the reinforcing stay (16), support of the gas shutoff valve (14) by the gas regulator (9) is reinforced with the reinforcing stay (16). As shown in FIGS. 5 and 6, the reinforcing stay (16) covers the gas shutoff valve (14) from below. Therefore, vibrations of the gas shutoff valve (14) are suppressed by the reinforcing stay (16), which prevents the damage to the gas shutoff valve due to the vibrations. Further, it is possible to prevent the heat damage to the gas shutoff valve (14) due to the radiation of the heat from the exhaust manifold (6).

As shown in FIGS. 2, 3, and 6, the metal stay (13) includes a base portion (13a) along the back wall (3c) of the cylinder head (3), a middle portion (13b) bent diagonally backward and downward from an upper end edge of the base portion (13a), and a tip end portion (13c) bent diagonally backward and upward from a back end edge of the middle portion (13b). A back face of the gas regulator (9) is attached to a front face of the tip end portion (13c).

As shown in FIGS. 3 and 6, the engine hanging locking plate (15) is lead out diagonally forward and upward from a front edge of the middle portion (13b) of the metal stay (13) and a hook locking hole (15a) is formed in a lead-out end portion of the engine hanging locking plate (15).

As shown in FIGS. 3, 5, and 6, the reinforcing stay (16) includes a base portion (16a) attached along an upper face of the middle portion (13b) of the metal stay (13), a middle portion (16b) bent upward from a front end edge of the base portion (16a), and a tip end portion (16c) bent diagonally forward and upward from the middle portion (16b). A lower face of the gas shutoff valve (14) is connected to an upper face of the tip end portion (16c).

What is claimed is:

1. A spark-ignition engine comprising: an engine cooling fan disposed in front of the engine; a flywheel disposed behind the engine; a cylinder head cover mounted to an upper side of a cylinder head; an intake manifold mounted to one side wall of the cylinder head; an exhaust manifold mounted to the other side wall of the cylinder head; a throttle body; a gas mixer; a gas regulator; and a gas relay pipe,
   wherein a collector portion of the intake manifold is supported to extend in a front-back direction on one side of the cylinder head cover, the throttle body is mounted to a back portion of the collector portion of the intake manifold, the gas mixer is mounted to a back portion of the throttle body above the flywheel,
   the gas regulator is disposed on a side of the exhaust manifold above the flywheel and mounted to the cylinder head, and the gas relay pipe is supported to extend sideways between the gas regulator and the gas mixer behind the cylinder head cover.

2. The spark-ignition engine according to claim 1,
   wherein the gas regulator is disposed diagonally behind and above the exhaust manifold and mounted by a metal stay to a back wall of the cylinder head.

3. The spark-ignition engine according to claim 2,
   wherein an engine hanging locking plate is lead out from the metal stay and the engine hanging locking plate is disposed above the exhaust manifold.

4. The spark-ignition engine according to claim 2,
   wherein the gas regulator includes a gas shutoff valve,
   the gas shutoff valve is mounted to a fuel inlet on a front side of the gas regulator above the exhaust manifold, and
   the gas regulator is sloped forward and upward.

5. The spark-ignition engine according to claim 4,
   wherein a reinforcing stay is attached to the metal stay, the gas shutoff valve is connected to the reinforcing stay, support of the gas shutoff valve by the gas regulator is reinforced with the reinforcing stay, and
   the reinforcing stay covers the gas shutoff valve from below.

6. The spark-ignition engine according to claim 3,
   wherein the gas regulator includes a gas shutoff valve,
   the gas shutoff valve is mounted to a fuel inlet on a front side of the gas regulator above the exhaust manifold, and
   the gas regulator is sloped forward and upward.

7. The spark-ignition engine according to claim 6,
   wherein a reinforcing stay is attached to the metal stay, the gas shutoff valve is connected to the reinforcing stay, support of the gas shutoff valve by the gas regulator is reinforced with the reinforcing stay, and
   the reinforcing stay covers the gas shutoff valve from below.

* * * * *